United States Patent [19]

Chippendale

[11] Patent Number: 4,858,033
[45] Date of Patent: * Aug. 15, 1989

[54] APPARATUS FOR PACING, QUEING AND EQUIPMENT CONTROL IN AUDIOVISUAL WORK

[76] Inventor: Arthur J. Chippendale, 1033-S Southwood Dr., San Luis Osbispo, Calif. 93401

[ * ] Notice: The portion of the term of this patent subsequent to Apr. 21, 2004 has been disclaimed.

[21] Appl. No.: 27,605

[22] Filed: Mar. 18, 1987

[51] Int. Cl.$^4$ .............................................. G11B 27/02
[52] U.S. Cl. .................................. 360/14.2; 360/72.2
[58] Field of Search ....................... 360/13, 14.1–14.3, 360/72.2

[56] References Cited

U.S. PATENT DOCUMENTS

| | | | |
|---|---|---|---|
| 4,067,049 | 1/1978 | Kelly et al. | 360/14.1 |
| 4,100,607 | 7/1978 | Skinner | 360/14.2 X |
| 4,351,007 | 9/1982 | Youngquist | 360/13 |
| 4,428,001 | 1/1984 | Yamamura et al. | 360/14.1 X |
| 4,507,691 | 3/1985 | Ishiguro et al. | 360/14.3 |
| 4,660,107 | 4/1987 | Chippendale, Jr. | 360/14.3 |
| 4,698,664 | 10/1987 | Nichols et al. | 360/14.3 X |

OTHER PUBLICATIONS

"The ECS-100 'Super stick' Series"; International Broadcast Engineer vol. 10, No. 168, Nov. 1979.
"A Flexible Digital Sound-Editing Program for Minicomputer Systems"; Griffiths et al.—J. Audio Eng. Soc. vol. 30, No. 3, 1982 Mar.

Primary Examiner—Aristotelis M. Psitos
Attorney, Agent, or Firm—James E. Brunton

[57] ABSTRACT

An electronic device designed for use in conjunction with a cueing and pacing apparatus incorporating a time-code generator and reader. A device for use in the production of synchronized composite sound tracks for audiovisuals, including film and videotape. More particularly the device concerns video and sound-track profiling, automated voice or narration track editing, precision sound laying, cueing for multi-track mixing, audiovisual or projector programming, and tape with film resolving. The device's components are mounted and interconnected within a desk top console containing a sloping front panel, from which its displays can be seen and its controls operated. At the heart of the device is a time-code decoder, a memory unit, a time-code comparator, a programming and control unit, a keypad, and, a time-code and a memory address display.

11 Claims, 8 Drawing Sheets

CONSOLE COVER-64

CONSOLE CHASSIS AND SIDE PANELS-66

THE PURPOSE OF THIS PRESENTATION
IS TO INTRODUCE YOU TO A NEW
PRODUCT AND SYSTEM, THE PACER
SYNCHRO-PROMPT AND THE
SYNCHRO-PROMPT SYSTEM, FOR USE IN
THE PRODUCTION OF SYNCHRONIZED
COMPOSITE SOUND TRACKS...

SOUND TRACKS COMBINING VOICE OR
NARRATION, MUSIC, AND SOUND
EFFECTS...
THE PACER SYNCHRO-PROMPT IS A
HIGHLY ACCURATE AND RELIABLE
ELECTRONIC CUEING AND PACING
DEVICE DESIGNED SPECIALLY FOR
AUDIO AND AUDIOVISUAL WORK...

TOGETHER WITH ITS CORRESPONDING
FORMS AND PROCEDURES THEY BECOME
A COMPLETE SOUND-WITH-SOUND, AS
WELL AS SOUND-AND-PICTURE
MATCHING SYSTEM......

FIGURE 5

THEY ARE BASED ON A METHOD
ANALOGOUS TO THE PRECISION SOUND
LAYING TECHNIQUES EMPLOYED IN
PROFESSIONAL SOUND-FILM
PRODUCTION...

WITH VOICE-OVER NARRATION FILMS,
THE VOICE AND OTHER SOUND TRACKS
ARE RECORDED AFTER THE FILM HAS
BEEN SHOT...

THE NARRATION IS THEN READ WILD,
THAT IS, WITHOUT THE BENEFIT OF A
CUEING AND PACING PROVISION, OR
IT IS CUED AND PACED BY A
PROJECTED WORKPRINT COPY OF THE
FILM...

THIS PICTURE WORKPRINT, WHICH HAS
BEEN EDITED TO A SCRIPT OR AN
OUTLINE, THEN SERVES AS THE BASIS
FOR ALL SUBSEQUENT FILM CUTTING
AND SOUND LAYING STEPS...

FIGURE 6

THE PURPOSE OF THIS PRESENTATION
IS TO INTRODUCE YOU TO A NEW
PRODUCT AND SYSTEM, THE PACER
SYNCHRO-PROMPT AND THE
SYNCHRO-PROMPT SYSTEM, FOR USE IN
THE PRODUCTION OF SYNCHRONIZED
COMPOSITE SOUND TRACKS...

SOUND TRACKS COMBINING VOICE OR
NARRATION, MUSIC, AND SOUND
EFFECTS...
THE PACER SYNCHRO-PROMPT IS A
HIGHLY ACCURATE AND RELIABLE
ELECTRONIC CUEING AND PACING
DEVICE DESIGNED SPECIALLY FOR
AUDIO AND AUDIOVISUAL WORK...

TOGETHER WITH ITS CORRESPONDING
FORMS AND PROCEDURES THEY BECOME
A COMPLETE SOUND-WITH-SOUND, AS
WELL AS SOUND-AND-PICTURE
MATCHING SYSTEM......

001

OK

002
ADD—1
003

OK

004
X ← PAPER RUSTLING NOISE

FIGURE 7

THEY ARE BASED ON A METHOD
ANALOGOUS TO THE PRECISION SOUND
LAYING TECHNIQUES EMPLOYED IN
PROFESSIONAL SOUND-FILM
PRODUCTION...
WITH VOICE-OVER NARRATION FILMS,
THE VOICE AND OTHER SOUND TRACKS
ARE RECORDED AFTER THE FILM HAS
BEEN SHOT...
THE NARRATION IS THEN READ WILD,
THAT IS, WITHOUT THE BENEFIT OF A
CUEING AND PACING PROVISION, OR
IT IS CUED AND PACED BY A
PROJECTED WORKPRINT COPY OF THE
FILM...
THIS PICTURE WORKPRINT, WHICH HAS
BEEN EDITED TO A SCRIPT OR AN
OUTLINE, THEN SERVES AS THE BASIS
FOR ALL SUBSEQUENT FILM CUTTING
AND SOUND LAYING STEPS...

APPARATUS FOR PACING, QUEING AND EQUIPMENT CONTROL IN AUDIOVISUAL WORK

BACKGROUND OF THE INVENTION

1. Field of the Invention

The present invention relates generally to audio and audiovisual work. More particularly the invention concerns an improved method and apparatus for video and sound-track profiling, automated voice and narration track editing, precision sound laying, cueing for multitrack mixing, audiovisual and projector programming and tape with film resolving/synchronization.

2. Discussion of the Prior Art

There exist today various types of cueing and automatic audio and video tape editing units. One of the most successful presently existing devices for cueing and pacing is disclosed in co-pending U.S. patent application Ser. No. 06/587,616 filed by the present inventor. The present invention is specifically directed to expanding the capabilities of this apparatus and more particularly to automating and augmenting the functions performed by the cueing and pacing apparatus disclosed in application Ser. No. 06/587,616, now U.S. Pat. No. 4,660,107 issued 4/21/87.

As will be discussed in greater detail in the paragraphs which follow, the device of the present invention offers numerous advantages over prior art units For example, the device will provide preselected pause times between narrated statements or segments during an automatic edit/dub of a narration recording. At the same time, it will automatically mute or attenuate unwanted sounds which are frequently found between narrated statements or segments It will also provide a fractional second display and control of the time-code derived from the cueing and pacing apparatus with which the device is interconnected.

SUMMARY OF THE INVENTION

It is a primary object of the present invention to provide an improved electronic cueing and pacing apparatus and the method of using the same for graphically interrelating the audio and visual elements of a presentation to time.

More particularly it is an object of the invention to provide an improved method and apparatus of the aforementioned character which will operate continuously and silently and will facilitate the measuring, timing and profiling of visuals; the writing of measured scripts to compliment pre-timed and pre-edited visuals; the cueing and pacing of narration; the programming of film strip, slide and multi-image presentations; and the profiling of music, lyrics and sound effects, stage light cueing and music scoring.

Another object of the invention is to provide an improved method and apparatus of the character described which enable sound and video editing; the setting of script texts for pre-recorded and pre-edited narration tracks to time; the plotting and laying of sound tracks; sound mixing and the production of composite sound tracks; and the resolving and synchronizing of tape with sprocketed film.

Still another object of the invention is to provide a method and apparatus of the class described in the preceding paragraph with which composite synchronized sound tracks can be produced at lower cost without the need for intermediate sprocketed sound tracks as used in conventional film-sound track production.

In summary, the design of the device of the present invention is based on the use of a time-code recorded on, and retrieved from, one of the audio tracks of a multitrack audio or video tape, through a cueing and pacing apparatus of the character described in Ser. No. 587,616 with which the device of the present invention is operably associated.

At the heart of the present device, which is intended to be operably coupled with the previously identified cueing and pacing apparatus, which includes a first display device, are various associated elements, namely a second display device adapted to display audio and visual data, the second display device being operably associated with the first display device of the cueing and pacing device; programming and automatic control means operably associated with the second display device for receiving input signals and for operably controlling the second display device in response to said input signals; decoder means operably interconnected with the cueing and pacing device for accepting a running time code in minutes and seconds from the cueing and pacing device; first supplemental means operably associated with the decoder means for receiving the first running time code and for augmenting the first running time code to include fractional second increments; second supplemental means operably associated with the decoder means for augmenting time codes received from the decoder to include fractional second increments; memory means operably associated with the first and second supplemental means for receiving therefrom augmented time codes and for storing the augmented time codes; manual data input means operably associated with the memory means for manually inputting data into the memory means; comparison means operably coupled with the memory means for comparing time codes stored therein and for detecting coincidences in the time codes, the comparison means further including signal generating means for generating an electrical signal upon the detection of a coincidence in the time codes; and multiple control means operably associated with the comparison means and the memory means for receiving an electrical signal from the comparison means and for transmitting the signal to the programming and control means.

The operating elements which make up the device of the invention are mounted and interconnected within a desk top console containing a sloping front panel, from which the displays can easily be seen and the controls readily operated.

These and other features of the invention will become apparent from the discussion which follows.

BRIEF DESCRIPTION OF THE DRAWINGS

FIG. 5 is a generally diagramatic view illustrating the manner in which a script is marked to indicate the best or selected takes of a narration recording.

FIG. 6 is a generally diagramatic view similar to FIG. 5, further illustrating the manner in which a script is marked to indicate the best or selected takes of a narration recording.

FIG. 7 is a generally diagramatic view illustrating the manner in which some pages of a script should then be marked to indicate required edits, their cue numbers, and corresponding real or adjusted time-codes.

FIG. 8 is a generally diagramatic view similar to FIG. 7 further illustrating the manner in which some pages of a script should then be marked to indicate required edits, their cue numbers and corresponding real or adjusted time-codes.

DESCRIPTION OF THE INVENTION

Figure 1:
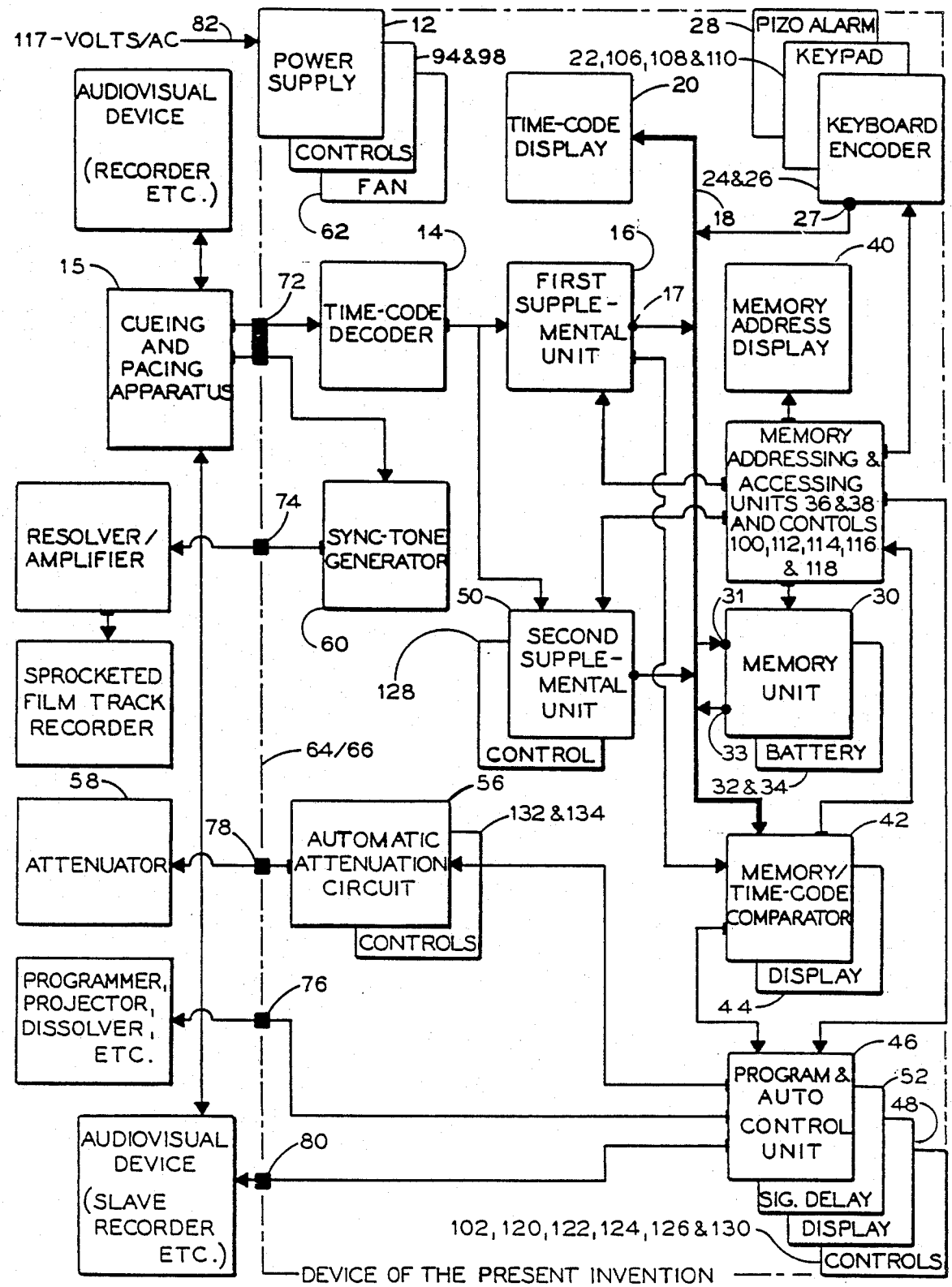
FIG. 1 is a generally schematic view illustrating the interrelationship of the various operating elements which comprise the electronic circuitry of the device, of the present invention.
Figure 2:
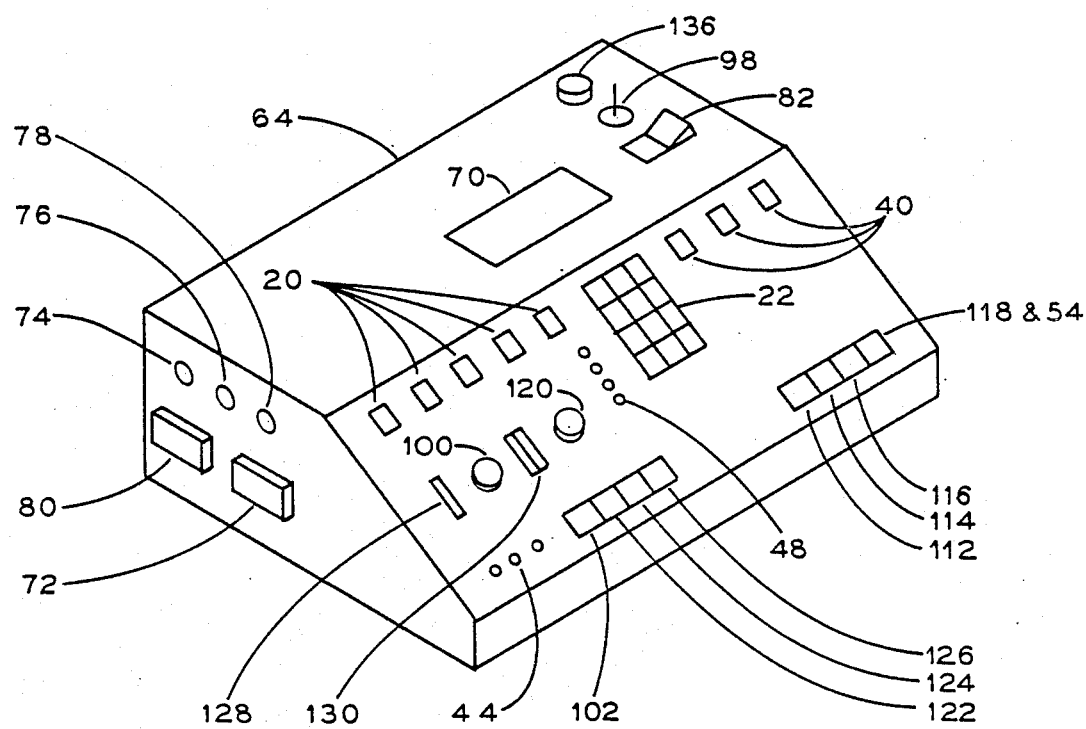
FIG. 2 is a perspective view of the one form of the device of the invention illustrating the input and output ports or connectors, the AC power cable, as well as the controls and displays of the device.

Referring to the drawings and particularly to FIGS. 1 and 2, the device of the invention comprises the following operably associated components: An integrated power supply 12 which provides electrical power, an incoming decoder means, or time-code decoder 14, a first supplemental means or supplementary counter 16; a main bus line 18, and a time-code display means or display unit 20. A manual data input means is here provided in the form of a keypad 22, and a keyboard encoder 24. Additional operating elements include a latching circuit 26, a Pizo alarm 28, and a memory means or memory unit 30. Further components comprise a battery and battery charger 32, and switching circuit 34, a memory addressing and accessing unit 36 and fast forward circuit 38 and a memory address display 40. Operably associated with the memory means is comparison means for comparing time codes stored within the memory. The comparison means is here provided in the form of a memory/time-code comparator 42 and comparator status display 44. For performing necessary control functions there is provided a programming and automatic control means shown here as a programming and control unit 46. Additional associated elements depicted in FIG. 1 include a program display 48; a time-code delay circuit 50 and program delay circuit 52, an odd-/even cue display 54, automatic attenuation control circuit 56 and an external line attenuator 58. Augmenting the aforementioned elements are a sync-tone generator 60 and a whisper fan 62. The construction of the operational interaction among these components and their interaction with the cueing and pacing device will be further described hereinafter.

For maximum flexibility and serviceability the major functional units are treated as modules, with their respective components being mounted on individual circuit boards.

In practice, time-codes can be entered into the memory means or memory unit 30 through the manual data input means or keypad and keyboard encoder 22 and 24, or through the time-code decoder 14 and the first or second supplemental units 16 and 50, by way of the cueing and pacing apparatus identified in FIG. 1 by the numeral 15. The time codes can then be compared with a running time-code contained on a multitrack audio or video tape by means of the comparison means or memory/time-code comparator 42. Whenever the comparator detects a time-code coincidence between sequential time-codes in the memory and those contained on a running audio or video tape, it signals the control means or programming and control unit 46 to initiate a preprogrammed function, such as starting or stopping an interconnected slave recorder (see FIG. 4).

Having now identified the basic component parts of the device, the methods of the invention can perhaps best be illustrated by way of application examples.

DISCUSSION OF APPLICATIONS

Profiling

Profiling, in the context of this discussion, means producing a chronological record of events. Time/-profiling relates those events to time and, more specifically, to ascending or real time, in minutes, seconds, and fractions thereof. More particularly, it means relating key points in a sound track or pertinent visual events in a film or videotape, to real time. This requires the ability to freeze real time, so as to record juxtaposed cues, while one monitors a sound or videotape in real time. The device of the present invention not only makes this possible, but it makes it possible at computer speed.

Such timed profiles will indicate the total and intermediate times of a sound or video recording, where each event takes place, starts, and stops. They will indicate whether a musical passage is long enough to bridge a particular time span, or whether a narrative statement will fit within a predetermined scene length. They will pinpoint the visual cues needed for click track production and music scoring, as well as pace and time the beat of a musical composition. Through such profiles one can match audio and visual elements and be more creative in sound and video editing through the ability to make decisions about real time events in leisure time.

To time/profile a sound or video recording, a cueing and pacing apparatus time-code is placed on a track adjacent to the sound or video recording one wishes to time/profile. On playback, the time-code is then fed through the cueing and pacing apparatus to the device of the present invention; whereupon, one can observe the running time-code in the time-code display 20. And, while monitoring the audio or video recording, one simply presses the clocking button 118 each time one hears or sees the events one wishes to relate to real time. As one presses the clocking button the running time-code is momentarily stopped and committed to memory. Upon release of the clocking button, the memory address and address display 40 automatically advance to the next address or cue.

On completion of a timed/profile, both the time-codes and corresponding addresses or cues can be readily retrieved for subsequent use such as posting them on an outline, a script, or one of the special forms which are part of the cueing and pacing apparatus system.

A music or sound effects recording thus profiled, will indicate the times and locations of each point of interest: An accent, a particular note, a change in tempo, rhythm, or volume, the introduction of a new instrument, song lyrics, or, a sound effect.

AUTOMATED VOICE OR NARRATION TRACK EDITING

Another function that the improved apparatus of the present invention is designed to perform, is automated voice or narration track editing. No matter how expert a narrator may be, the original voice track recording will need editing, not just to eliminate narrator flubs and flaws, but to correct for producer/director interruptions and incorrect pause times as well. To do this, the sound engineer, the producer/director, and often the narrator, will together monitor a playback of the recording. They will make notes and decisions as to which of the various takes to use, which pauses to extend, and which to tighten up. The sound engineer/editor will then mark the tape, or cue it, for subsequent cutting and splicing. The present invention offers a markedly superior way to accomplish this type of editing.

First the recording itself is made on a two track tape, with the narration on track-1 and a cueing and pacing apparatus time-code on track-2. Then, while monitoring the recording in playback, the script is marked in the manner illustrated in FIGS. 5, 6, 7 and 8, to indicate the selected takes and sequential cue numbers which identify the needed edit points. The recording can then be edited electronically without cutting and splicing. Better yet, by means of the device of the present invention, it can be edited with precision automatically. This is done by dubbing on cue to an intermediate tape, or directly to a master multi-track tape from which a final composite can be mixed.

After marking the script as prescribed, the recording is time/profiled using the time-code that was placed on track-2. The setup calls for reading the time-code through the cueing and pacing apparatus including a first audio visual means or display device, for example, a recorder and the device of the present invention. Then, while monitoring the narration recording, the clocking button 118, is clocked in real time at each of the cues marked on the script. As illustrated in FIGS. 7 and 8, there are two cues for each edit, an even and an odd cue. The even cues come at the end of a phrase or statement, and the odd cues at the beginning.

The memory addresses and cue numbers will coincide and the corresponding time-codes will be committed to memory. Here, however, a distinction is made between real time/profiling and adjusted time/profiling, and automatic editing of a narration track calls for adjusted time/profiling. By enabling the time-code delay circuit 50, the odd numbered (start) cues clocked in real time are automatically adjusted before entering the memory.

The adjusted time-codes, and the real time time-codes entered into the memory can then be compared, in sequence, with the running time-code on the narration tape. This is done while dubbing the narration track to the intermediate or the master multi-track tape from which the composite mix-down will be made, and, is done by means of the comparison means, or memory/time-code comparator, 42. At the same time, the even numbered (stop cues) are delayed by means of the program delay circuit 52, which also forms part of the device of the present invention. The above adjustments provide for appropriate pauses between odd and even cues, that is, the pauses needed between narrative phrases and statements.

With each time-code coincidence detected by the time-code comparator, a signal is passed to the programming and automatic control means or control unit 46, which reacts within milliseconds. Associated relays then operate appropriately with each adjusted or delayed time-code coincidence. With the contacts of these relays connected to a second audio visual means, or display device such as a slave recorder having a remote access port and pause/record capability, the action of the relays will then start and stop the second display device or slave recorder on cue. In this way, only the selected (good) takes will be dubbed with appropriate pauses between them.

In practice, the procedure is easy and much simpler than physically cueing, marking, cutting, and splicing the tape in accordance with prior art techniques. It is more precise, and one need not worry about changes in presence, or cutting the original recording in the wrong place.

On completion of an automatic edit/dub, a real time/profile of the dubbed narration track will indicate the actual start and ending of each successive narrative phrase or statement. These new time-codes can then be used to place the script on a set of cueing and pacing apparatus system forms in relation to real time, with precision. Corresponding visuals can then be posted in proper juxtaposition to the script, and the music and sound effect tracks plotted and laid accordingly.

LAYING MULTI-TRACK SOUND

Still another function that can be performed using the device of the present invention, is laying multi-track Sound. In an audiovisual presentation, be it film, videotape, or a sound-slide show, what one hears is a composite sound track; a sound track consisting of voice or narration, music and sound effects, all blended together. However, they are not originally recorded that way, all at the same time, but are, instead, the result of individual recordings subsequently blended together onto a composite tape through a mixer.

In conventional prior art film production techniques, each of the sound elements are recorded or dubbed onto individual sprocketed magnetic film tracks, which are individually conformed or matched with the picture workprint. They are then run through individual playback machines in synchronism or interlock with each other, as a sound engineer mixes them onto a sprocketed composite track.

Another way is to place each of the sound elements on individual tracks of a multitrack tape, such that each is properly juxtaposed to the other. The trick, however, is to lay the individual tracks on a multitrack tape, so that they are properly juxtaposed to one-another. The solution is a time-code wherein each of the tracks are laid in conformity with the time-code. A time-code track which can in turn be readily correlated with the visuals.

The previously identified cueing and pacing apparatus which is both a time-code generator and a reader, will fill the time-code needs, while the cueing and pacing apparatus system will provide the sound laying plan. And, together with the device of the present invention, they make it possible to lay the sounds according to the plan. In this way, the crest of a sound, a clap of thunder, or a subtle chime, can be laid in proper juxtaposition to other sound elements as well as visuals, for greatest realism, dramatic effect, and emotional impact.

As with automated voice track editing, the voice, music, and sound effects to be laid are recorded or dubbed onto a donor tape which is time/profiled as previously discussed. But, unlike automated voice or narration track editing, two time-codes are required; one on the donor tape, and one on the multi-track tape onto which the individual sounds are to be laid. This way, the multitrack tape on the slave recorder, can be parked at time-code positions just prior to where each sound element being laid is to start. The cueing and pacing apparatus has two time-code inputs for this purpose; one for reading the time-code on the donor tape on the donor recorder, and the one on the multitrack tape on the slave recorder.

Figure 4:
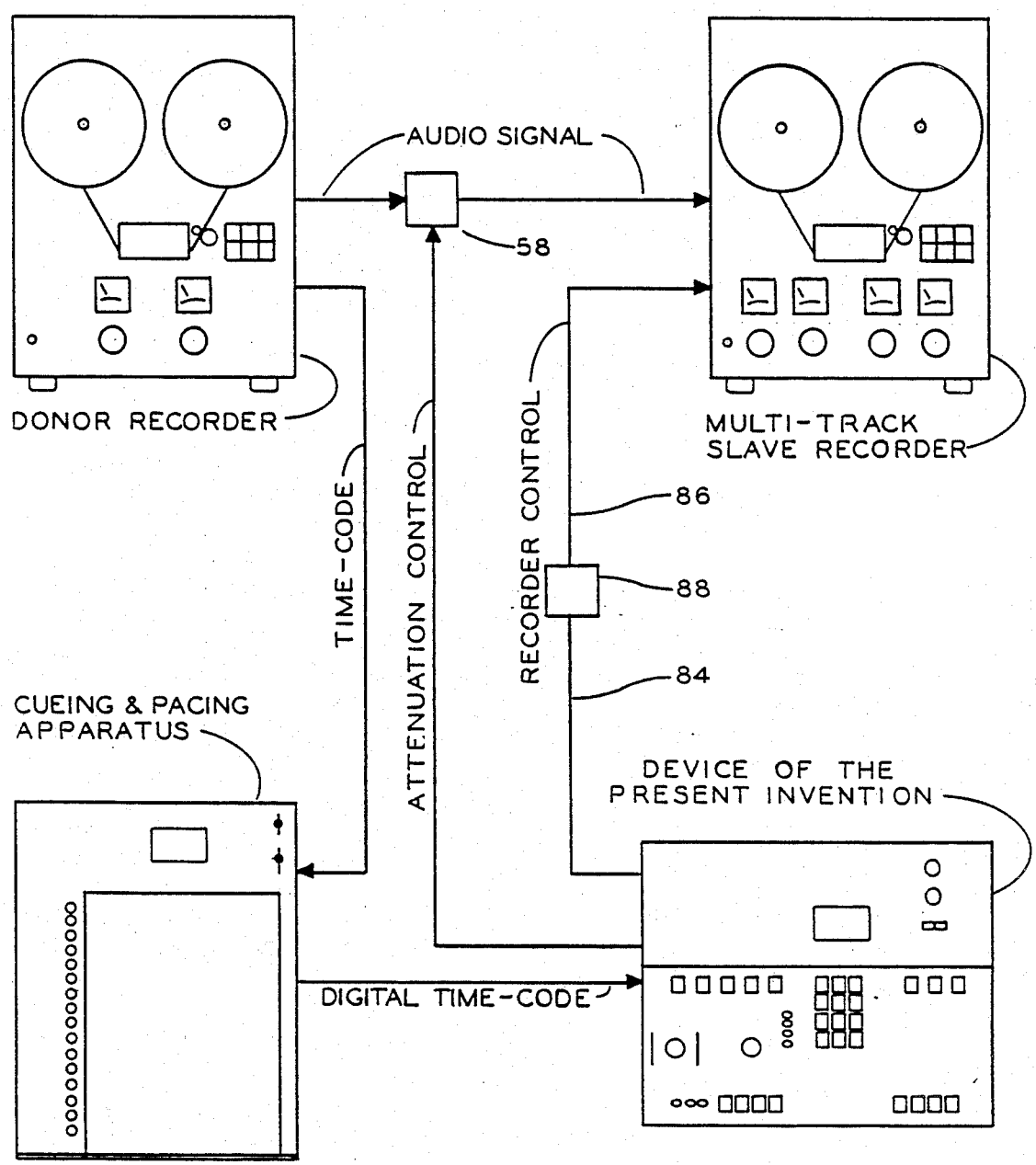
FIG. 4 is a generally diagramatic view illustrating the principal equipment used in the course of performing the various functions that can be performed by the device of the invention together with their interconnecting cables.

So, with the equipment interconnected in the manner illustrated in FIG. 4, the multiple sound tracks can be laid according to plan as follows: First the designated track on the multi-track recorder is properly set and placed in the record/ready mode. The time-code switch on the cueing and pacing apparatus is then set to read the time-code on the donor tape, and the first display device, or donor recorder, started in the playback mode. As the time-code comparator 42, detects the respective time-code coincidences, it will signal the programming and control unit 46, to start and stop the second audio visual means shown here as a slave recorder such that the respective sound elements will be dubbed onto the multitrack tape precisely as planned, segment by segment, and track by track.

AUDIOVISUAL PROGRAMMING

Yet another function that can be performed using the device of the present invention, is audiovisual or projector programming. It can be used to trigger or sequence single or multiple slide projectors on precise cues. But, rather than using recorded tone signals for doing so, it utilizes time-codes which can be selected to within a fraction of a second.

Time-codes corresponding with a presentation's visual cues can be entered into the device's memory unit, either through the manual data input means or keypad or a timed/profile. The memory/time-code comparator will then signal the programming and control unit during playback of the composite tape, to sequence a projector or projectors, with each time-code coincidence.

Moreover, the start advance circuit 50, makes it possible during profiling to enter adjusted time-codes into the memory which will automatically compensate for the sequencing delay of a projector. In this way, the images can be made to appear exactly on cue with the sound track.

TAPE TO FILM RESOLVING

Tape to film resolving is another function that can be performed using the device of the present invention. Tape to film resolving usually involves the use of a pulse or sync-tone signal recorded on a magnetic tape along-side the original sound recording. Its purpose is to control the speed of a sprocketed track recorder, when dubbing the tape recording to a sprocketed film track. This way, variations in tape speed, both during recording and playback, are compensated for, and the sprocketed film track can be conformed with the corresponding picture film. The process is a costly one, particularly where multiple sound tracks, which are to be mixed, are involved. In the case of narrative or voice-over films however, there is a simpler and less costly way.

If the finished film workprint is timed by footage and frame count and profiled on a set of cueing and pacing apparatus system forms (Illustrated in FIGS. 5 and 6, of the Cueing and Pacing Apparatus Patent Application Serial No. 06/587,616) the script can be posted against the visuals, and the voice, music, and sound effect tracks plotted accordingly. And, if the individual sound tracks are then laid on a multi-track tape to conform with the forms and corresponding time-code, then the mixed-down composite tape can be readily conformed with the sprocketed film.

The sync-tone generator 60, in the device of the present invention produces a sync-tone derived from the recorded time-code itself. So, if the original time-code on the multi-track tape, against which the individual tracks are laid, is dubbed to the composite tape as a corresponding sync-tone during mix-down, then the dubbed signal can be used to control the resolver when dubbing the composite sound track to sprocketed film. Whereas the process involves the use of a commercial resolver/amplifier to synchronously drive the sprocketed track recorder, it does not require the costly conforming of the individual sprocketed tracks for voice, music, and sound effects, or, the multiple sprocketed-track/multi-machine mixdown.

Figure 3:
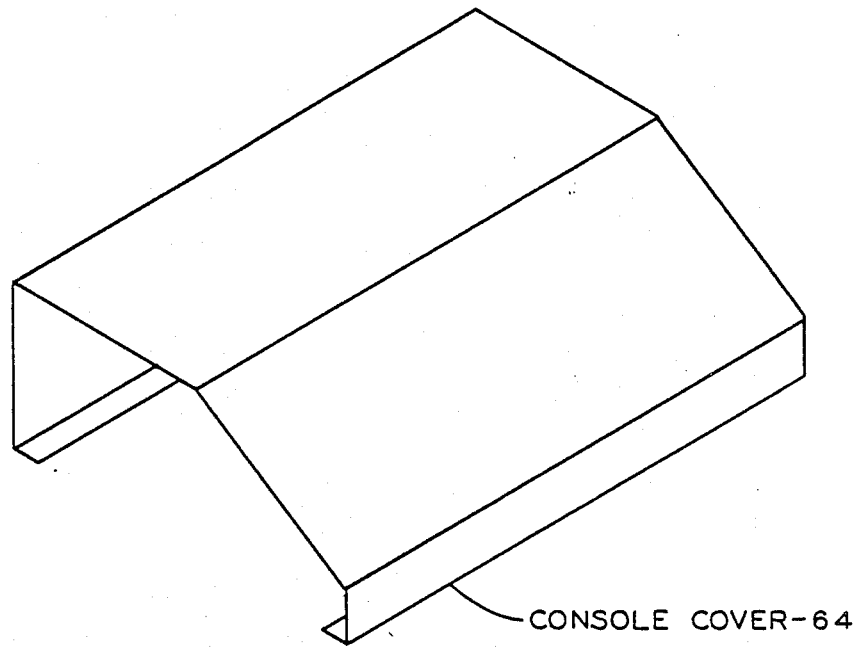
FIG. 3 is an exploded perspective view illustrating console chassis and cover which make up the desk top console of the device of the invention.
Figure 3:
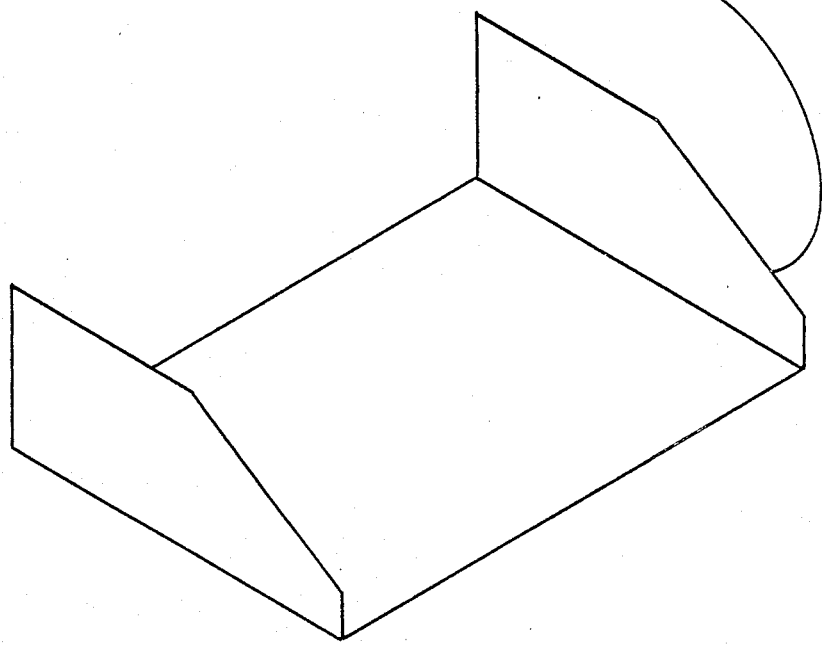

Turning once again to FIGS. 1, 2, and 3, of the drawings, the device of the present invention utilizes digital electronic technology. With few exceptions the components are mounted on printed circuit boards which attach to the chassis of the console enclosure, and the underside of the sloping front panel. Both halves of the enclosure 64 and 66, are preferably constructed from aluminum. When assembled, the two halves are hinged at the rear, and secured together with two screws at the front. A nameplate is affixed to the console cover, and four rubber feet or bumpers are affixed to the underside of the console chassis. All controls and connectors are marked for easy identification and location.

PRINCIPAL COMPONENTS

The power supply 12, which operates off a 117-volt AC line input, comprises a voltage reduction transformer, a full-wave bridge rectifier, a large storage or ripple reduction electrolytic capacitor, and three independent DC regulators with attendant capacitors. The output is +5-volts DC. A Fuse 136, and a pilot light 96, are incorporated into the power switching circuit.

The decoder means or time-code decoder and latching circuit 14, decodes the serial input from the cueing and pacing apparatus 15, through a serial-in/parallel-out shift register and together with the supplementary counter 16, latches and outputs a parallel 20-bit (or optional 24-bit) BCD time-code signal.

The first supplemental means or supplementary counter 16, is run by a 600-Htz square-wave clocking signal, derived from the time-code receiver of the cueing and pacing apparatus and provides for fractional second readings. Thus, the cueing and pacing apparatus time-code which normally reads in minutes and seconds is augmented, or broken, into finer increments for sound and video profiling, mixing, and other synchronization functions. It provides 1/10-second increments for both display and control purposes (or optionally 1/10th, 1/24th, 1/25th, 1/30th and 1/100th seconds).

The first supplementary means or supplementary counter, operates in synchronism with the time-code decoder and latching circuit 14, and is continually updated for accuracy and precise incremental values.

The parallel output from the time-code decoder 14, and the supplementary counter 16, is routed indirectly through tri-state switches 17, and main bus line 18, to the non-multiplexed time-code display 20. The tri-state switches, or gates, 17, 27, 31, 33 and 51 insure that only one time-code be present on the bus line 18 at any given time.

The main bus line 18, comprises a 20 (or optional 24) conductor time-code line, terminating at the time-code display 20.

The time-code display means, or display 20, serves as a multi-purpose unit, displaying time-codes received from either the time-code decoder 14, and supplementary counter 16, the keypad and keyboard encoder 22 & 24, and latching circuit 26; or, the memory unit 30, or the time-code delay circuit 50.

The time-code display consists of five (or optionally six) 7-segment displays, driven by BCD decoder drivers and associated resistors.

The manual data input means, or keypad 22, keyboard encoder 24, and latching circuit 26, permit writing time-codes directly into the time-code display 20, without system clocking. The keypad 22, is made up of independent positive contact, push buttons (single-pole/double-throw switches). The keyboard encoder 24, outputs a BCD (binary coded decimal) code which is routed to the latching circuit 26. The latches are enabled one-at-a-time in sequence by means of a shift register incorporated into the keyboard encoder circuit.

The latches then output their parallel code to the time-code display 20, through tri-state switches 27 and the main bus line 18. The keyboard encoder 24, also contains a roll-over port which is used to activate a Pizo alarm 28.

The Pizo alarm 28, functions to alert the device operator, should two numerical keypad keys be inadvertently pressed at the same time, thus avoiding a false entry into the time-code display 20, or the memory unit 30.

The memory means or memory unit 30 comprises individual random access memory chips or integrated circuits which read the individual coded numbers in the time-code display 18. They can be activated to write those numbers into its memory cells on command. The memory unit can also read and display their memory content through the time-code display 20, when properly enabled. The memory inputs and outputs are controlled by tri-state gates 31 and 33. A small rechargeable battery and battery charger 32, and switching circuit 34, can hold the memory circuit temporarily active when the synchro-mate is turned off.

The battery and battery charger 32, and switching circuit 34, can hold the memory unit active when an operator steps out to lunch or home for the weekend. The memory chips whose memories are otherwise volatile when the synchro-mate is turned off, can thus be held for 72 hours or so.

The memory addressing and accessing unit 36, comprises a dual set of counters. One of the sets is a three stage decade circuit for driving the address display 40. It counts from 0 to 255 addresses, or cues, and resets. The automatic reset prevents the decade counters from counting and displaying beyond the 256 address capacity of the memory chips. The second counter set is a binary circuit for addressing and accessing the memory chips themselves. The two sets of counters which operate in synchronism are clocked by a common, fully conditioned push button switch 118 or by a signal received from the memory/time code comparator 42, when operating in the auto mode. Additionally, a fast forward circuit 38 will advance the address rapidly on command. The unit also performs one other important function; it distinguishes between odd and even numbered cues, a function displayed through the LED 54 incorporated in the unit's clocking button 118.

The fast forward circuit 38, which advances the address and cue numbers rapidly, derives its 3.75-PPS clocking signal from a 60-Htz power line conditioning circuit and a binary counter. It is activated by the fast forward control 116.

The memory address display 40, is a three digit numerical display which exhibits the memory address clocked by the memory addressing and accessing controls, or one clocked by a time-code coincidence when the device of the present invention is operating in the auto mode.

The address displayed can be either an open or clear address, and one into which a time-code can be written, or, a memory address from which a time-code was just retrieved, depending on the position of the main function control 98. The display will reflect address or cue numbers from 001 through 255.

The comparison means or memory/time-code comparator 42, compares all the digits of a time-code simultaneously to produce a less than, equal to or more than output signal. It compares the running time-codes from the time-code decoder 14 and the supplementary counter 16, or the time-code delay circuit 50, with time-codes previously entered into the memory unit 30. It can also compare two running time-codes for synchronization and interlock of two tape recorders. The unit consists simply of five (or optionally six) cascaded comparator chips. The less than, equal to, and more than outputs are reflected by the comparator status display 44. When the device of the present invention is operating in the auto mode, the memory/time-code comparator does two things with each time-code coincidence it detects. It signals the programming and control unit 46 to initiate the next in a series of preprogrammed events and it triggers the memory addresssing and accessing unit 36, to advance to the next address or cue.

The comparator status display 44, comprises three horizontally placed LEDs which indicate the status or relationship of the running time-code derived from the cueing and pacing apparatus with those brought in from the memory unit 30.

When the left-hand LED is lit, it indicates that the incoming time-code is trailing the one displayed by the time-code display 20. The center LED lights briefly with each time-code coincidence, And, when the right-hand LED is lit, it indicates that the incoming time-code is ahead of the one displayed by the time-code display 20.

The programming and automatic control means, or control unit 46, sequences the preprogrammed steps to be performed. The variable sequencer takes its cues from the memory/time-code comparator 42, and outputs its commands through miniature positive contact relays. The unit provides for the interface with the outside world: tape recorders, mixers, synchronizers, etc.

The program display 48, consists of a vertical row of LEDs which indicate the sequence position of a running program.

The second supplemental means, or time-code delay circuit 50, with tri-state outputs 51, is for use in conjunction with automatic or semi-automatic voice track editing, as well as audio-visual programming. When enabled by the main function control 100, the circuit operates as a second time-code latching and supplementary counter also outputting a 20-bit (or optional 24-bit) BCD coded time-code, but which can be variably offset behind the decoding/latching and supplementary counter circuits 14 and 16.

During adjusted time/profiling, the two latching and counter circuits output their time-codes alternately with each time-code coincidence. In this way, the odd numbered cues are adjusted time-code numbers, whereas, the even numbered cues are real time time-code numbers. This function is controlled by the flip-flop circuit in the memory addressing and accessing unit 36, which distinguishes between odd and even cues.

The time-code delay circuit can place a 1/10th to an 9/10th second delay on the incoming time-code transmission, by simply enabling the circuit's latches and resetting the circuit's counter behind the input phase. Whereas delay circuits are commonplace, their design and applications are normally related to digital signals in serial form. Here, however, we are concerned with a 20-bit (or optional 24-bit) time-code signal in parallel form. And rather than using a complicated arithmetic circuit for off-setting the two time-codes by subtraction or addition of a differential constant as might be found in a tape-to-tape synchronizer, the time-code delay circuit 50 utilizes a 1-of-10 BCD decoder which follows the BCD output of the counter in the first supplemental unit 16. The 10 outputs of the BCD decoder are then used to selectively off-set the latching and clocking of the second supplemental unit or time-code delay circuit 50. Thus, the 20-bit (or optional 24-bit) parallel time-code is synchronously off-set here in a simple and unique way.

The program delay circuit 52, is closely associated with the programming and control unit 46. It allows stopping a slave recorder in accordance with a pre-established time delay. A time delay from 1/10 of a second to 9-seconds after initiation of a stop. A function also used for voice track editing. However, unlike the time-code delay circuit 50, the output here is a single delayed pulse derived from a simpler counter circuit.

The automatic attenuation circuits 56 and 58, also work in conjunction with the programming and control unit 46. They can place ¼-second or ½-second fade-outs and fade-ins on pauses between narrative statements, thereby eliminating unwanted acoustic noise within them.

The automatic attenuation circuit 56, comprises an up/down binary counter with a minimum/maximum count control, and a resistor network. Its analog output is an ascending or descending DC voltage, used to control the line attenuator 58. Depending upon the position of the automatic attenuation rate control 134, the up/down counter is clocked by either a 30-PPS or a 60-PPS signal derived from the rapid Advance clock, which forms part of the memory addressing and accessing unit 36. The up or down counting mode of the counter is governed by the programming and control unit 46.

The line attenuator 58, is a self contained unit. It is placed between a Donor recorder's line Output, and a slave recorder's line Input. It comprises a single attenuation chip, capacitors, and a +12-volt supply. In effect, it operates as a supplementary volume control, governed by the variable DC voltage output of the automatic attenuation circuit 54. Depending on the control voltage level, it can output a +13 db audio signal, above input level, and, attenuate one by as much as −90 db. At 0-db, it can pass audio signals well above 10K-Htz without significant distortion. To prevent in-line RF noise, the unit is totally shielded.

The synch-tone generator 60, comprises a sign-wave synthesizer made up of a divide by five counter, a capacitor and set of resistors. Its 300-Htz square-wave input signal is derived from the receiver in the cueing and pacing apparatus. And, because its 60-cycle sign-wave output is derived directly from the incoming time-code signal to the cueing and pacing apparatus, it can be used to run a resolver/amplifier and in turn control a sprocketed track recorder, when dubbing from magnetic tape to sprocketed film.

The whisper fan 62, provides forced air cooling within the console 64 and 66. In addition to the bottom and real ventilation slots in the console, intended for convection cooling, the whisper fan insures proper heat dissipation. The fan is normally left running when the device is in use, but can be turned off, should the slight fan noise interfere with a critical audio monitoring of a sound track.

With the exception of the CMOS based sign-wave synthesizer which forms the sync-tone generator 60, the CMOS based memory unit 30, and one CMOS chip associated with the pause control 102, the device of the present invention utilizes TTL (Transistor-Transistor-Logic) integrated circuits throughout.

PRINCIPAL CONTROLS

The main power switch 94, is a rocker type toggle switch, which turns the device on or off. It incorporates a pilot light 96, which illuminates when the switch is on.

The fan switch 98, is a toggle switch, which is normally left on.

The main function control 100, is a multi-position rotary switch for enabling the time-code decoder 14, and supplementary counter 16, the keypad and keyboard encoder 22 & 24, and latching circuit 26, the memory unit 30, the time-code delay circuit 50, and the program delay circuit 52.

The main function control 100, is a dual purpose switch, in that it also switches the device from manual to auto operation. That is, when the switch is set to keypad, time-codes can be manually entered into the time-code display 20, and the memory unit 30, through the keypad 22, and the memory/display addressing and accessing controls 118, 120, 122, and 124. And, when the switch is set to memory, time-codes can be manually retrieved from the memory unit 30, and displayed in the time-code display 20, through the memory/display addressing and accessing controls 112, 114, 116, and 118. However, when the switch is set to time/profiling, adjusted time/profiling, or program delay, a running time-code can be observed in the time-code display 20. And, time-code coincidences detected by the memory/time-code comparator 42, will automatically advance the memory addresses and cues, as well as trigger functions to be performed by the programming and control unit.

The keypad and keyboard encoder controls. The keypad contains ten numerical keys 106, for entering time-code numbers into the time-code display 20, a clearing key 108, for clearing the time-code display 20, and, an enable key 110, for enabling the keyboard encoder 24. When the keypad and keyboard encoder is enabled through the main Function control 100, time-codes can be entered into the time-code display and memory unit through the keypad and memory addressing and accessing controls.

The memory addressing and accessing controls comprise a set of four push buttons: the memory/display clearing and enable control 112, the memory/display clearing control 114, the memory/display fast forward control 116, and the memory/display clocking control 118.

The multiple control means, or programming controls comprise a program selection control 120, and a set of three push buttons: the program clearing control 122, the program setting control 124, and the program clocking control 126. The rotary program selection control 120, sets the number of sequential steps to be performed in each control sequence. For example, to start a slave recorder at a time-code coincidence and stop it at the next time-code coincidence, the switch is set to 2. To start a second display device as, for example, a slave recorder at a time-code coincidence, then trigger a stop delay, and then stop the slave recorder on the next time-code coincidence (at the end of the delay), the control is set to 3.

The time-code delay thumbwheel control 128 comprises a ten position thumb wheel switch for setting a time-code delay during an adjusted time/profile.

The program delay controls comprises a set of ten position thumb wheel switches 130, for setting time delays, and an extended pause control push button 102.

The extended pause control 102 is a fully conditioned, push button, which provides for an extended pause between odd and even cues, or narrative phrases or statements. It is used during voice or narration track editing.

The automatic attenuation controls, comprises an automatic attenuation enable control 132, and an attenuation rate control (a double-throw toggle switch with a center off position) 134, for both enabling and selecting the attenuation rate.

So as to interface the device of the present invention with the cueing and pacing apparatus, and other ancillary equipment, there are five input-output connectors and corresponding multi-conductor cables:

Connectors

As shown in FIG. 2, the time-code input connector 72 is for interfacing the device, with the cueing and pacing apparatus.

The sync-tone output connector 74 is for connecting the device to a resolver.

The cue signal output connector 76 is for connecting the device to an audio/visual programmer, a slide projector, or slide projector dissolve unit.

The attenuation control output connector 78 is for connecting the device to the external line attenuator 58.

The multi-purpose output connector 80 is for connecting or interfacing the device with second display means such as tape recorders, mixers and synchronizers.

Cables and Patch Box

The AC power cable 82, together with its three pin plug, is for connecting the device to an AC power line.

The cueing and pacing apparatus cable 84, is a multi-conductor cable together with its multi-pin connectors. It is for interfacing the device with the cueing and pacing apparatus.

The patch box cable 86, and the recorder cable 90, together with their matching multi-pin connectors, and patch box 88, are for interfacing the device with a tape recorder having a remote control access port. The patch box 88, is for matching the device's control outputs with a recorder's remote control functions. It incorporates a patching switch 104.

The attenuation control cable 92, is a two conductor cable, together with matching connectors, for controlling the external line attenuator 58.

Having now reviewed the audio-visual applications, as well as the principal components and controls, a brief discussion of the device of the present invention, in use, should clarify its special features.

The Device In Use

Insofar as the overall system is concerned, there are three kinds of profiling: profiling, time/profiling, and adjusted time/profiling.

Straight profiling refers to the marking of a script, to indicate the number and nature of recorded takes, the selected takes, the edit points, and associated cue numbers. Its primary use is in relation to a narration recording. FIGS. 5 and 6, represent pages 1 and 2 of an audio-visual script, and form an integral part of the profiling process. The suspension dots indicate that narration pauses are required where used; three dots where a 1 to 2-second pause is needed, and six suspension dots where 2½ to 3½ second pauses are required to punctuate a change in theme. With a script set up as illustrated in FIGS. 5 and 6, vertical lines can be drawn alongside the script as the recording is monitored in playback. They can be drawn with a pen or pencil guided by a straight edge. The lines will indicate that a statement or passage was indeed recorded, and where the narrator may have flubbed, by simply stopping the lines opposite the points in the script, where the narration was aborted. A subsequent line, or lines to the right, will then indicate retakes.

The recording should then be monitored in playback once more, and a check mark made to indicate the best and correct takes. At the same time, one should pay close attention to pauses. Are they correct in length? Are the pause inflections right? Are they noisy? Notations should then be made accordingly, per FIGS. 7 and 8. A review of the sheets will then indicate where the narration tape must be edited because of unwanted noises, narrator flubs, and pauses which need adjustment. At each place where the recording is to be edited, sequential cue numbers are then posted, with a pen or pencil, to the right of the lines, starting with 001. Note that there are two cue numbers required for each edit.

The next step is to time/profile the narration recording using a cueing and pacing apparatus time-code on an adjacent track. However, in order to perform an automated edit/dub, the time-code delay circuit 50 should be enabled, by setting the main function control 100, to adjusted time/profiling, and the time-code delay thumb-wheel control 128, set appropriately. For most narration track applications it should be set to 0.5-seconds. Then, while monitoring the original narration recording, the clocking button 118, is pressed and released at each of the cues marked on the script. The address and cue number will coincide, and corresponding time-codes will be committed to memory, except that with the time-code delay circuit enabled, the odd numbered cues committed to memory will be adjusted time-code numbers, while the even numbered cues will be real time numbers. As will presently become clear, the real time numbers related to the even numbered cues, must also be adjusted, but this will be done during the dubbing operation that follows.

The real time-code numbers and the adjusted time-code numbers entered into the memory as just previously described, can then be compared, in sequence, with the running time-code on the narration tape. This is done while dubbing the narration to an intermediate or master multi-track tape, and it's done by means of the memory/time-code comparator.

Whenever the time-codes coincide, the comparator signals the programming and control unit, which reacts within milliseconds, to start or stop the slave recorder. It is for this reason that the time-codes corresponding with the odd cues must be adjusted before entering the memory unit, and why the time-codes corresponding with the even numbered cues must be delayed during the edit/dub operation. Otherwise, the slave recorder will stop exactly at the end of an edit point, and restart at precisely the beginning of the succeeding one, without leaving any blank tape or pause time in between, for example, between two independent phrases or statements.

However, with the time-code delay circuit enabled, and the corresponding thumb wheel control set at 0.5-seconds during the adjusted time/profiling, the slave recorder to which the narration is being dubbed, will start 0.5-seconds in advance of the actual or real time cue. That is, it is in advance of the articulation of the succeeding phrase or statement; thus providing 0.5-seconds of blank lead-in tape. This happens because during the adjusted time/profiling, the time-code entered into the memory is 0.5-seconds lower in value, than the real time at which the clocking button was pressed.

To provide the remaining pause time between narrative phrases or statements, we must enable the program delay circuit after completing the adjusted time/profiling, but before starting the automatic edit/dub, by means of the main function control 100, and the thumb wheel controls 130.

The program delay circuit can be set to stop the slave recorder within 1/10 of a second, to 9-seconds from the actual ending of a cue, narrative phrase or statement. One second is a practical setting. If we then add the ½ or 0.5-second start advance to the 1-second stop delay, we end up with a 1½ second pause between an odd and even cue, or between two independent phrases or statements. The latter should be considered as a "standard pause".

Now, the hard wired push button 102, defeats or disengages the thumb wheel controls 130, and provides for a 2½ second program delay, when activated. When combined with a ½ or 0.5-second start advance, it will automatically provide a 3-second "extended pause", a suitable pause to emphasize a change in theme. Thus, during the edit/dub operation, one can readily go from 1½ second standard pauses to 3-second extended pauses by means of this push button control.

Longer pauses, up to 9 and 8/10th seconds, can also be programmed by a combined setting of the two circuits. For example, if we should want a nine second narrative pause between two statements, the time-code delay control can be set at 0.5-seconds, and the program delay controls at 8.5-seconds; the two add up to 9. This might be used to provide room for a sustained silence or musical bridge.

THE PROBLEM OF NOISE

In spite of our efforts to produce a flawless voice track or an ideal one for editing purpose, what we end up with, however, is often less than desired. Pauses are frequently too short, and to make matters worse, they are often noisy as well.

Studio noises, producer/director interruptions, paper rustling, narrator swallowings, burpings and throat clearing within pauses, are not what we want.

To remove the unwanted acoustic noises during an electronic edit, the donor tape can be stopped at a point just before the noise occurs, while allowing the slave recorder to continue for the time required by the pause. Alternately, the noise can be muted during the dub, by means of a muteing switch, or, by means of a manual fader control. All this is easier said than done, however, when working in real time. In answer to this problem, the device of the present invention incorporates another special feature, the automatic attenuation circuits.

The automatic attenuation circuits work in conjunction with the device's start and stop functions, and can place or lift a progressive attenuation on the slave recorder's voice track line, on cue. And, they do this within a fraction of a second, without leaving an abrupt change in presence, as would a muting switch.

In other words, the automatic attenuation circuits can place an automatic fade-out and a fade-in on all edited pauses, thus eliminating any noise between the fade-out and fade-in points.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for audio visual programming of the character including a cueing and pacing device adapted to generate a running time code in minutes and seconds, said cueing and pacing device comprising a base; a first display means carried by said base for visually indicating the passage of time; a second display means adapted to operate synchronously with said first display means said second display means comprising a multiplicity of spaced apart linearly aligned signal means carried by said base and adapted for sequential activation at predetermined intervals for indicating the passage of time; data display means carried by said base for use in recording and displaying data, said data display means including a writing surface having provided thereon a multiplicity of lines spaced apart by a distance corresponding to the distance between said spaced apart signal means; control means for simultaneously stopping and starting said first and second display means; and interconnection means for interconnecting said control means with a first audio visual means adapted to display audio or visual data and in which said control means is adapted to stop and start said first audio visual means simultaneously with stopping and starting said first and second display means, the improvement comprising:

(a) a second audio visual means adapted to display audio or visual data, said second audio visual means being operably associated with said first audio visual means of said cueing and pacing device;

(b) programming and automatic control means operably associated with said second audio visual means for receiving input signals said second audio visual means and for operably controlling said second audio visual means in response to said input signals;

(c) decoder means operably interconnected with said cueing and pacing device for accepting a first running time code in minutes and seconds from said cueing and pacing device;

(d) first supplemental means operably associated with said decoder means for receiving said first running time code and for augmenting said first running time code to include fractional second increments;

(e) second supplemental means operably associated with said decoder means for augmenting time codes received from said decoder means to include fractional second increments;

(f) memory means, including receiving means for selectively receiving said augmented time codes, said memory means being operably associated with said first and second supplemental means for selectively receiving therefrom augmented time codes and for storing said augmented time codes;

(g) manual data input means operably associated with said memory means for manually inputting time codes into said memory means;

(h) comparison means operably coupled with said memory means for comparing time codes inputted by said cueing and pacing device and by said manual data input means and stored within said memory means with augmented time-codes received by said receiving means of said memory means and for detecting coincidences therebetween, said comparison means further including signal generating means for generating an electrical signal upon the detection of a coincidence in said time codes; and (i) multiple control means operably associated with said comparison means and said memory means for receiving an electrical signal from said comparison means and for transmitting said electrical signal to said programming and control means.

2. An apparatus as defined in claim 1 further including means for variably off setting said output of said second supplemental means behind the output of said first supplemental means.

3. An apparatus as defined in claim 2 in which said comparison means is provided with first and second data inputs in which said first supplemental means is provided with first and second data outputs and in which said apparatus further includes time code display means operably associated with said memory means, said manual data input means and said first and second supplemental means for selectively accepting therefrom selected time codes.

4. An apparatus as defined in claim 3 further including gateing means operably associated with said first and second supplemental means for alternately gating data output from said first supplemental means and said second supplemental means.

5. An apparatus for audio visual programming including a first audio visual means for displaying audio and visual data and a running time code generating and reading means for generating and reading a running time code in minutes and seconds, said apparatus further comprising:

(a) a base;
(b) a first display means carried by said base for visually indicating the passage of time;
(c) a second display means adapted to operate synchronously with said first display means;
(d) data display means carried by said base for use in recording and displaying data;

(e) control means operably associated with said first and second display means for simultaneously stopping and starting said first and second display means;

(f) interconnection means for interconnecting said control means with first said audio visual means;

(g) a second audio visual means adapted to display audio or visual data, said second audio visual means being operably associated with said first audio visual means;

(h) programming and automatic control means operably associated with said second audio visual means for receiving input signals therefrom and for operably controlling said second audio visual means in response to said input signals;

(i) decoder means operably interconnected with said running time-code generating and reading means for accepting a running time code in minutes and seconds from said time code generating and reading means;

(j) first supplemental means having first and second data outputs operably associated with said decoder means for receiving said first running time code and for augmenting said first running time code to include fractional second increments;

(k) second supplemental means operably associated with said decoder means for augmenting time codes received from said decoder means to include fractional second increments;

(l) memory means operably associated with said first and second supplemental means for selectively receiving therefrom augmented time codes and for storing said augmented time codes;

(m) manual data input means operably associated with said memory means for manually inputting time codes into said memory means;

(n) comparison means having first and second data outputs operably coupled with said memory means for comparing time codes inputted by said cueing and pacing device and by said manual data input means and stored within said memory means with augmented time-codes received by said receiving means of said memory means and for detecting coincidences therebetween said comparison means further including signal generating means for generating an electrical signal upon the detection of a coincidence in said time codes;

(o) multiple control means operably associated with said comparison means and said memory means for receiving an electrical signal from said comparison means and for transmitting said signal to said programming and control means; and (p) time code display means operably associated with said memory means, said manual data input means and said first and second supplemental means for selectively accepting therefrom selected time codes.

6. An apparatus as defined in claim 5 further including means for variably offsetting said output of said second supplemental means can be variably offset behind the output of said first supplemental means.

7. An apparatus for audio visual programming including a first audio visual means adapted to display audio visual data comprising:

(a) a base;
(b) a first display means carried by said base for visually indicating the passage of time;

(c) a second display means adapted to operate synchronously with said first display means said second display means comprising a multiplicity of spaced apart linearly aligned signal means carried by said base and adapted for sequential activation at predetermined intervals for indicating the passage of time;

(d) data display means carried by said base for use in recording and displaying data, said means including a writing surface having provided thereon a multiplicity of lines spaced apart by a distance corresponding to the distance between said spaced apart signal means;

(e) control means for simultaneously stopping and starting said first and second display means;

(f) interconnection means for interconnecting said control means with said first audio visual means (g) time code generating and reading means for generating and reading a time code in minutes and seconds;

(h) a second audio visual means for displaying audio-visual data, said second audio visual means being operably associated with said first audio visual means;

(i) programming and automatic control means operably associated with said second audio visual means for receiving input signals therefrom and for operably controlling said second audio visual means in response to said input signals;

(j) decoder means operably interconnected with said time code generating and reading means for accepting a first running time code in minutes and seconds therefrom;

(k) first supplemental means operably associated with said decoder means for receiving said first running time code and for augmenting said first running time code to include fractional second increments;

(l) second supplemental means operably associated with said decoder means for augmenting time codes received from said decoder means to include fractional second increments;

(m) memory means including receiving means for selectively receiving said augmented time codes, said memory means being operably associated with said first and second supplemental means for selectively receiving therefrom augmented time code and for storing said augmented time code;

(n) manual data input means operably associated with said memory means for manually inputting data into said memory means;

(o) comparison means operably coupled with said memory means for comparing time codes in putted by said cueing and pacing device and by said manual data input means and stored within said memory means with augmented time-codes received by said receiving means of said memory means and for detecting coincidences there between, said comparison means further including signal generating means for generating an electrical signal upon the detection of a coincidence in said time codes; and (p) multiple control means operably associated with said comparison means and said memory means for receiving an electrical signal from said comparison means and for transmitting said signal to said programming and automatic control means.

8. An apparatus as defined in claim 7 further including means for variably offsetting said output of said second supplemental means behind the output of said first supplemental means and in which said comparison means is provided with first and second data inputs in which said first supplemental means is provided with first and second data outputs and in which said apparatus further includes time code display means operably associated with said memory means, said manual data input means and said first and second supplemental means for selectively accepting therefrom selected time codes.

9. An apparatus as defined in claim 8 further including means for controllably delaying control of said second audio visual means by said programming and automatic control means upon receipt of said electrical signal from said multiple control means.

10. An apparatus as defined in claim 8 further including attenuation means operably associated with said first and second audio visual devices for controllably muting said audio visual data transmission.

11. An apparatus as defined in claim 8 in which said time code generated by said time-code generating and reading means includes a 60-cycle synch-pulse signal and in which said apparatus further includes a synch-tone generator operably associated with said time code generating and reading means for reconstructing said 60-cycle synch-pulse signal for resolving and synchronozing audio visual data on a recording tape having a time code recorded thereon with a sprocketed magnetic film track.

* * * * *